US008643934B2

(12) United States Patent (10) Patent No.: US 8,643,934 B2
Ku et al. (45) Date of Patent: Feb. 4, 2014

(54) DISPLAY

(75) Inventors: Yun-Sheng Ku, Miaoli County (TW);
Kuo-Lung Lo, New Taipei (TW);
Wei-Yuan Cheng, New Taipei (TW);
Yu-Hsiang Tsai, Hsinchu County (TW);
Ching-Yao Chen, Taichung (TW);
Yu-Sheng Huang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 133 days.

(21) Appl. No.: 13/169,062

(22) Filed: Jun. 27, 2011

(65) Prior Publication Data

US 2012/0057217 A1 Mar. 8, 2012

Related U.S. Application Data

(60) Provisional application No. 61/379,730, filed on Sep. 3, 2010.

(30) Foreign Application Priority Data

Mar. 31, 2011 (TW) .............................. 100111315 A

(51) Int. Cl.
*G02B 26/00* (2006.01)
*G02F 1/03* (2006.01)
*G02F 1/133* (2006.01)

(52) U.S. Cl.
USPC .............................. 359/290; 359/245; 349/33

(58) Field of Classification Search
USPC ......... 359/290, 245, 253–254, 265, 291, 292, 359/296, 293, 295, 315–318, 276, 238, 242, 359/259, 244, 198, 260–263, 223, 224, 225, 359/301–303, 237; 349/33; 252/500, 586; 345/32, 41, 60, 84, 105–107, 204
See application file for complete search history.

(56) References Cited

U.S. PATENT DOCUMENTS 7,430,355 B2  9/2008  Heikenfeld et al.
2006/0221068 A1 10/2006 Feenstra et al.
(Continued)

FOREIGN PATENT DOCUMENTS

CN      101174071      5/2008
CN      102200632 A    9/2011
(Continued)

OTHER PUBLICATIONS

Heikenfeld et al., "Electrofluidic displays using Young—Laplace transposition of brilliant pigment dispersions", Nature Photonics, May 2009, vol. 3, p. 292-p. 296.
Song et al., "A scaling model for electrowetting-on-dielectric microfluidic actuators", Microfluid Nanofluid, Jul. 2009, vol. 7, p. 75-p. 89.
Fair, "Digital microfluidics: is a true lab-on-a-chip possible?", Microfluid Nanofluid, Mar. 2007, vol. 3, p. 245-p. 281.
(Continued)

*Primary Examiner* — Dawayne A Pinkney
(74) *Attorney, Agent, or Firm* — Jianq Chyun IP Office

(57) ABSTRACT

A display including a pixel array substrate, an opposite substrate and a fluid medium is provided. The pixel array substrate includes a first substrate including pixel regions and pixel structures disposed in the pixel regions. Each pixel region includes a distribution region of pixel electrode and a non-electrode region. A pixel electrode of the pixel structure is disposed in the distribution region of pixel electrode and has at least one slit extending from the non-electrode region toward the distribution region of pixel electrode. The opposite substrate includes a second substrate and a common electrode disposed on the second substrate and contacting a polar fluid. The fluid medium includes the polar fluid and a non-polar fluid and flows between the pixel array substrate and the opposite substrate. The non-polar fluid is contracted toward the non-electrode region when a voltage difference is generated between the pixel and the common electrodes.

9 Claims, 19 Drawing Sheets

(56) References Cited

U.S. PATENT DOCUMENTS

| | | | |
|---|---|---|---|
| 2008/0136990 A1* | 6/2008 | Kimura | 349/46 |
| 2009/0080052 A1 | 3/2009 | Chen et al. | |
| 2009/0185255 A1 | 7/2009 | Cheng et al. | |
| 2010/0128341 A1* | 5/2010 | Cheng et al. | 359/292 |

FOREIGN PATENT DOCUMENTS

| | | |
|---|---|---|
| WO | 2006021912 | 3/2006 |
| WO | 2006090317 | 8/2006 |
| WO | 2007141218 | 12/2007 |

OTHER PUBLICATIONS

Kuo et al., "63.2: Single Layer Multi-Color Electrowetting Display by Using Ink Jet Printing Technology and Fluid Motion Prediction with Simulation", 2010 SID, May 2010, p. 939-p. 942.

Hayes et al., "Video-speed electronic paper based on electrowetting", Nature, Sep. 2003, vol. 425, p. 383-p. 385.

"First Office Action of China Counterpart Application", issued on Dec. 3, 2012, p. 1-p. 5.

"Second Office Action of China counterpart application" issued on Jul. 24, 2013, p. 1-p. 6.

* cited by examiner

DISPLAY

CROSS-REFERENCE TO RELATED APPLICATION

This application claims the priority benefits of U.S.A. provisional application Ser. No. 61/379,730, filed on Sep. 3, 2010 and Taiwan application serial no. 100111315, filed on Mar. 31, 2011. The entirety of each of the above-mentioned patent applications is hereby incorporated by reference herein and made a part of this specification.

BACKGROUND OF THE DISCLOSURE

1. Technical Field

The disclosure relates to a display.

2. Background

An electrowetting display includes a plurality of electrowetting display pixel structures. Each of the electrowetting display pixel structures includes a barrier, a pixel electrode, an insulating layer, a hydrophobic layer, a polar fluid and a non-polar fluid. The insulating layer is disposed on a surface of the pixel electrode and the hydrophobic layer covers the insulating layer. The non-polar fluid is disposed on a surface of the hydrophobic layer. The polar fluid covers the non-polar fluid. The barrier is disposed on the hydrophobic layer to separate two adjacent pixel structures.

When a voltage is applied to each of the electrowetting display pixel structures, the polar fluid is driven by an electrostatic force to contact the pixel electrode. The non-polar fluid is then propelled to a corner corresponding to the hydrophobic layer of the pixel. Here, the position of the non-polar fluid is determined according to the design of various pixel electrodes. Generally, the non-polar fluid is a colored non-polar fluid medium such as oil or other material. The non-polar fluid is colored by using a pigment or a dye. The polar fluid medium is a colorless polar fluid medium such as water, alcohol, or so on. Thus, after the light passes through the non-polar fluid colored with a dye, the light is absorbed by the dye in the non-polar fluid to show a color of the dye in the non-polar fluid. On the contrary, the light passes through the transparent polar fluid. In other words, when a voltage is applied to the electrowetting display pixel structure, the polar fluid contacts the electrode so as to push the non-polar fluid to the barrier. Hence, a grayscale change in display can be carried out by converting the electrowetting display pixel structure between a voltage applying state and a no voltage state, such that the electrowetting display displays an image.

In order to ensure the consistency of a contraction of the non-polar fluid, a patterned pixel electrode is adopted for limiting the non-polar fluid to a corner of each of the electrowetting display pixel structures to achieve the above image display. For example, as depicted in FIGS. 1A and 1B, a pixel region 114 includes a distribution region of pixel electrode 118 and a non-electrode region 116. A pixel electrode PE is disposed in the distribution region of pixel electrode 118 and has an unfilled corner of a ¼ circle (as shown in FIG. 1A) or an unfilled corner of a ¼ rectangle (as shown in FIG. 1B) corresponding to the non-electrode region 116. The patterned pixel electrode of these shapes can increase the conversion speed of the electrowetting display pixel structure between the voltage applying state and the no voltage state.

FIGS. 2A to 2E are three-dimensional schematic diagrams illustrating a contraction process of a polar fluid converting from a no voltage state to a voltage applying state in an electrowetting display pixel structure having the pixel electrode PE shown in FIG. 1A. Referring to FIGS. 2A to 2E, it should be noted that when the electrowetting display pixel structure is driven under a higher voltage to increase the response speed, configurations of the patterned pixel electrodes PE may cause the fragmentation of the non-polar fluid 134 (represented by even dots) during the contraction process (shown by the breakage in FIG. 2D). The non-polar fluid 134 then gradually contracts back to the non-electrode region 116 of the electrowetting display pixel structure after a period of time. The fragmentation process of the non-polar fluid 134 may lead to decreasing aperture rate of the electrowetting display, increasing response time, increasing complexity in the design of driving system, and poor display quality.

SUMMARY

Embodiments disclosed herein may provide a display. The display may include: a pixel array substrate, an opposite substrate, and a fluid medium is introduced herein. The pixel array substrate includes a first substrate and a plurality of pixel structures. The first substrate includes a plurality of pixel regions. Each of the pixel regions includes a distribution region of pixel electrode and a non-electrode region. The pixel structures are disposed in the pixel regions. Here, each of the pixel structures includes a pixel electrode, an insulating layer, and a hydrophobic layer. The pixel electrode is disposed in the distribution region of pixel electrode and has at least one slit. The at least one slit has an extension direction from the non-electrode region toward the distribution region of pixel electrode. The insulating layer covers the pixel electrode. The hydrophobic layer covers the insulating layer. The fluid medium includes a polar fluid and a non-polar fluid flowing between the pixel array substrate and the opposite substrate. The opposite substrate includes a second substrate and a common electrode. The common electrode is disposed on the second substrate and contacts the polar fluid. The polar fluid and the non-polar fluid are present between the first substrate and the second substrate. The non-polar fluid is contracted toward the non-electrode region when a voltage difference is generated between the pixel electrode and the common electrode.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the disclosure.

DETAILED DESCRIPTION OF DISCLOSED EMBODIMENTS

Figure 3:
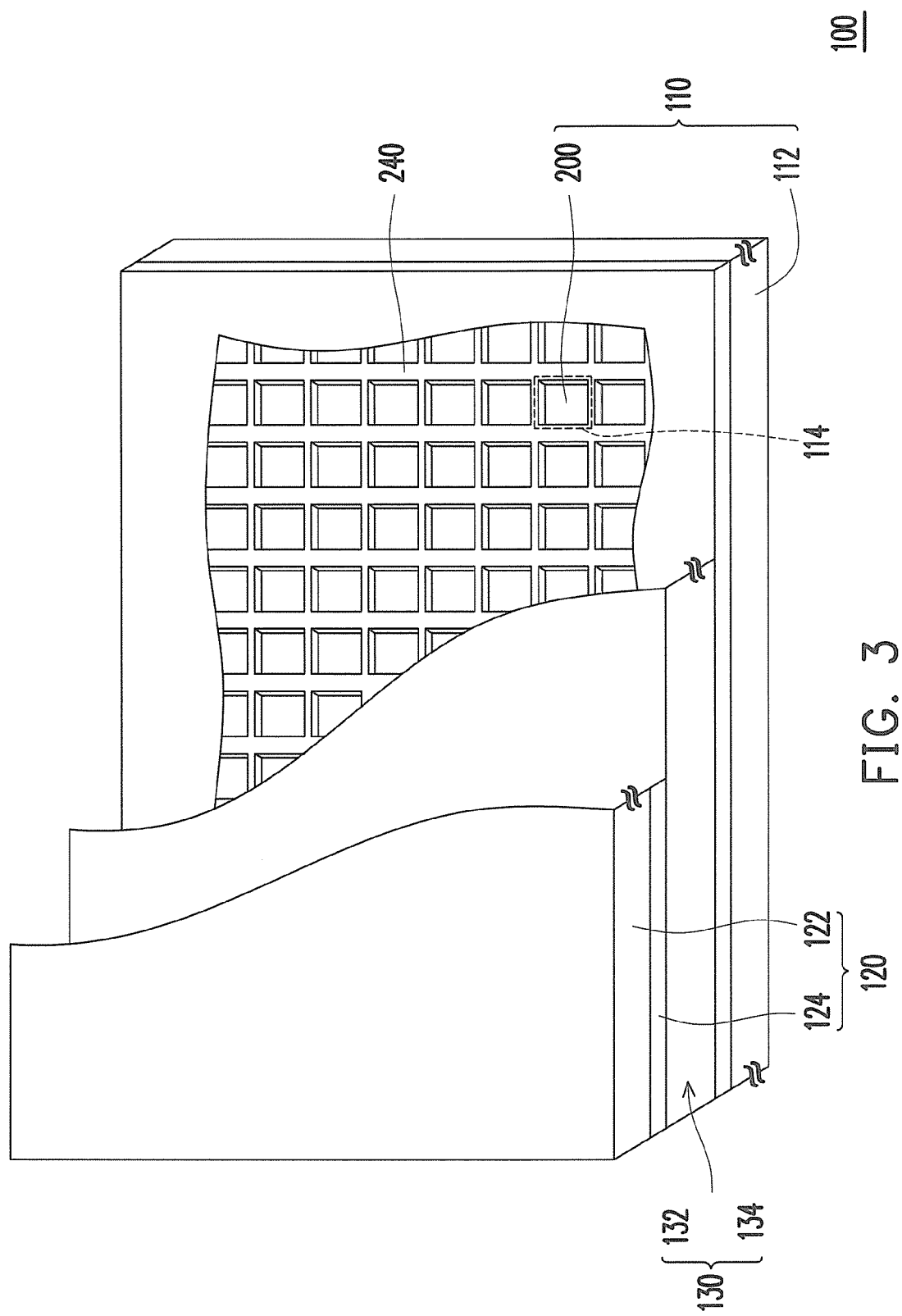
FIG. 3 is a schematic cross-sectional diagram illustrating a partial top view of a display according to an exemplary embodiment.

FIG. 3 is a schematic cross-sectional diagram illustrating a partial top view of a display according to an exemplary embodiment. Referring to FIG. 3, a display 100 of the present exemplary embodiment includes a pixel array substrate 110, an opposite substrate 120, and a fluid medium 130. The pixel array substrate 110 includes a first substrate 112 and a plurality of pixel structures 200. The pixel structures 200 are disposed on the first substrate 112 in an array, for example.

In the present embodiment, the opposite substrate 120 includes a second substrate 122 and a common electrode 124. The common electrode 124 is disposed on the second substrate 122. The fluid medium 130 includes a polar fluid 132 and a non-polar fluid 134 (represented by even, dense dots in FIGS. 4A to 4D) and flows between the pixel array substrate 110 and the opposite substrate 120. Moreover, the polar fluid 132 and the non-polar fluid 134 are not soluble in each other. In practice, a fluid medium such as colored oil or other non-polar solutions is used as the non-polar fluid 134 and a fluid medium such as a transparent water solution or alcohol is applied as the polar fluid 132. However, the disclosure is not limited thereto.

Figure 4A:
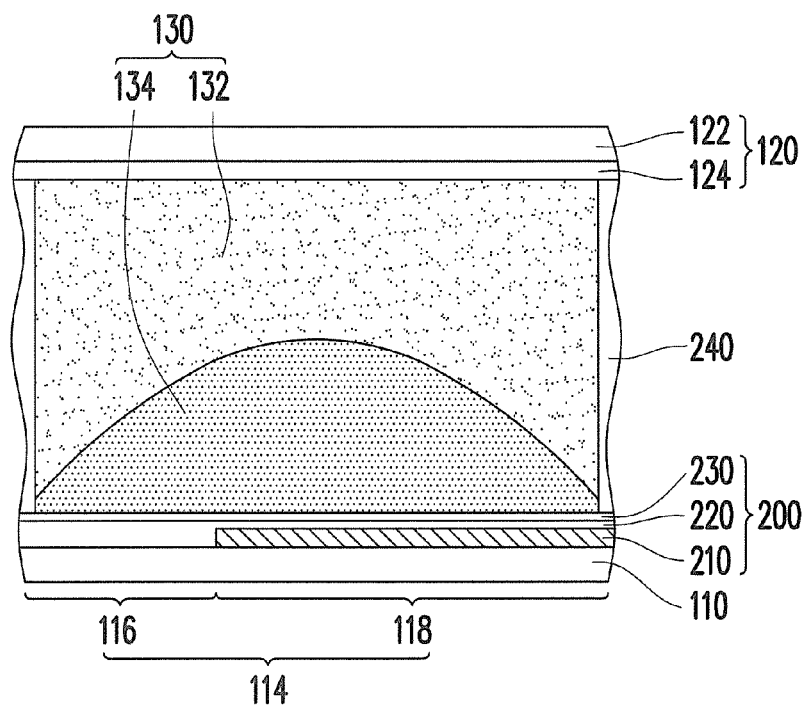
FIG. 4A and FIG. 4B are respectively schematic diagrams illustrating a cross-sectional view and a top view of the pixel structure in FIG. 3 under the no voltage state according to an exemplary embodiment.
Figure 4B:
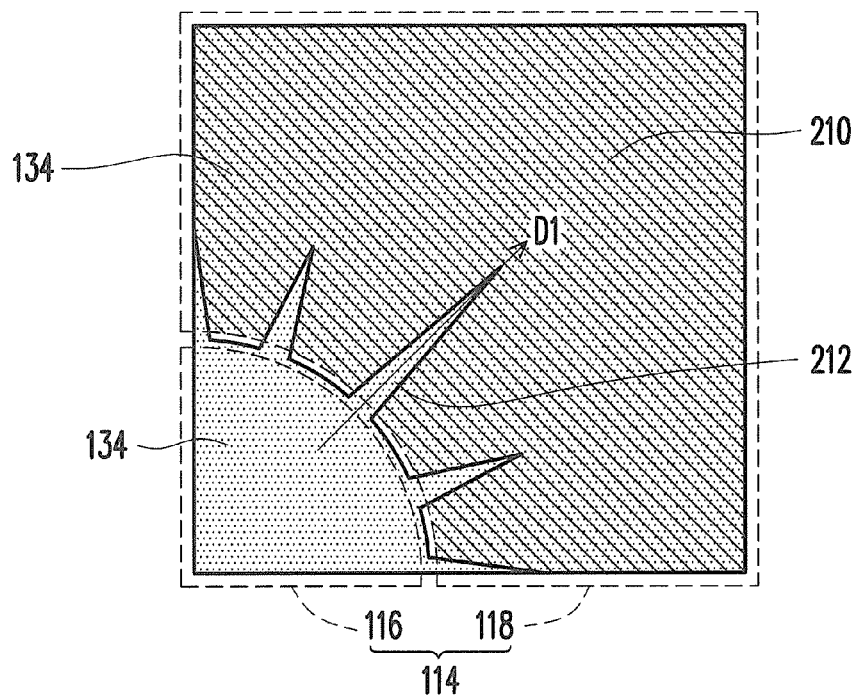
Figure 4C:
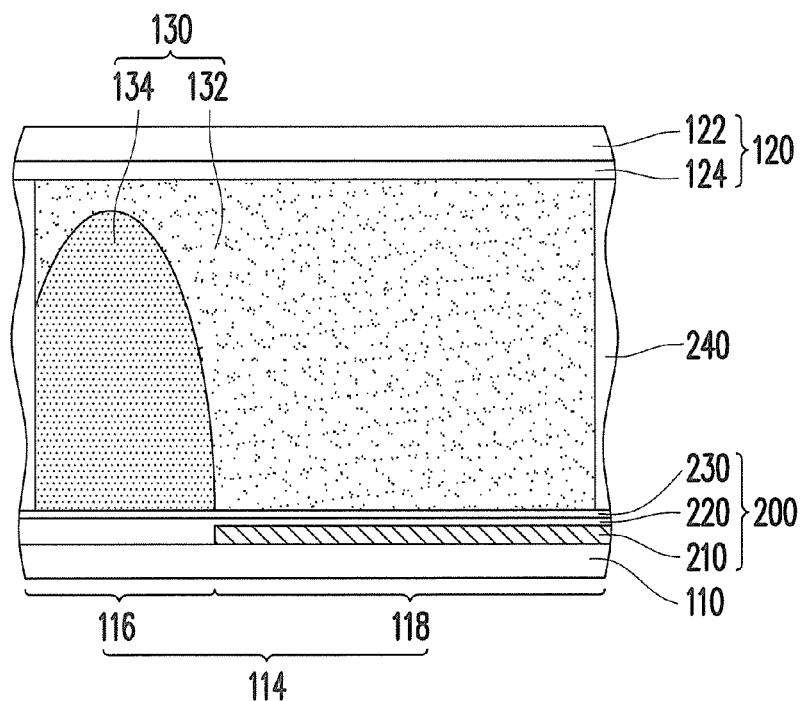
FIG. 4C and FIG. 4D are respectively schematic diagrams illustrating a cross-sectional view and a top view of the pixel structure in FIG. 3 under the voltage applying state according to an exemplary embodiment.
Figure 4D:
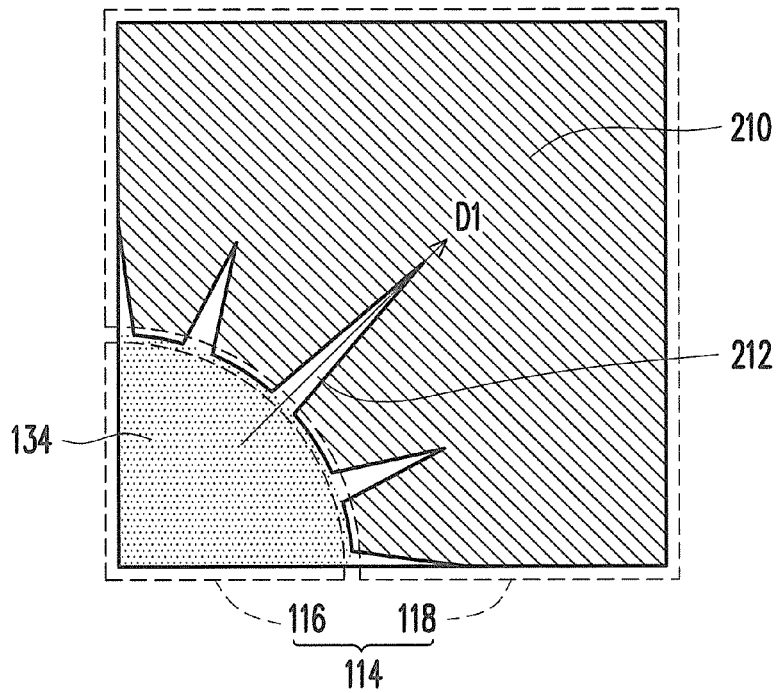
Figure 5A:
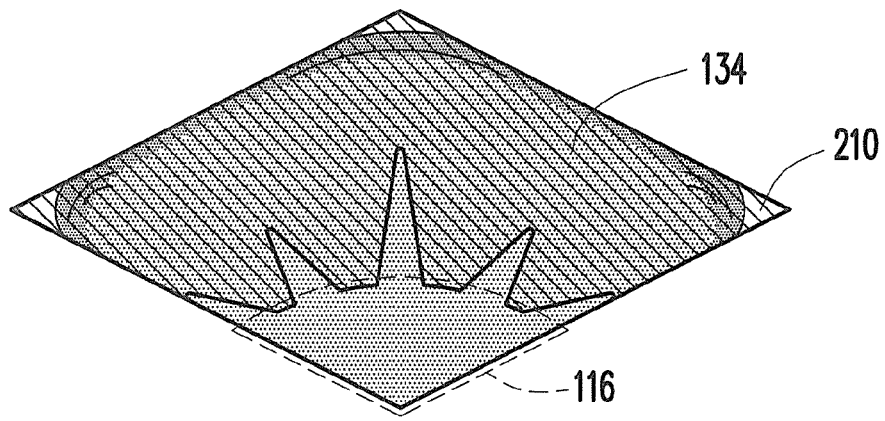
FIGS. 5A to 5F are 3D schematic diagrams illustrating a process of converting from the state in FIG. 4B to the state in FIG. 4D according to an exemplary embodiment.
Figure 5B:
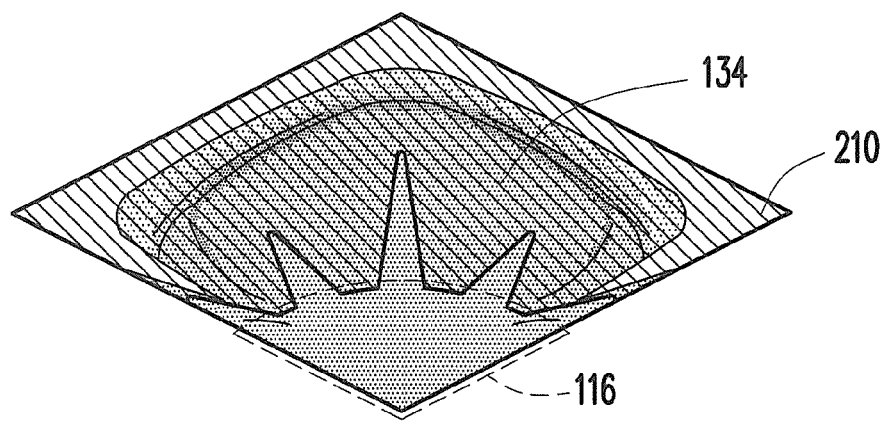
Figure 5C:
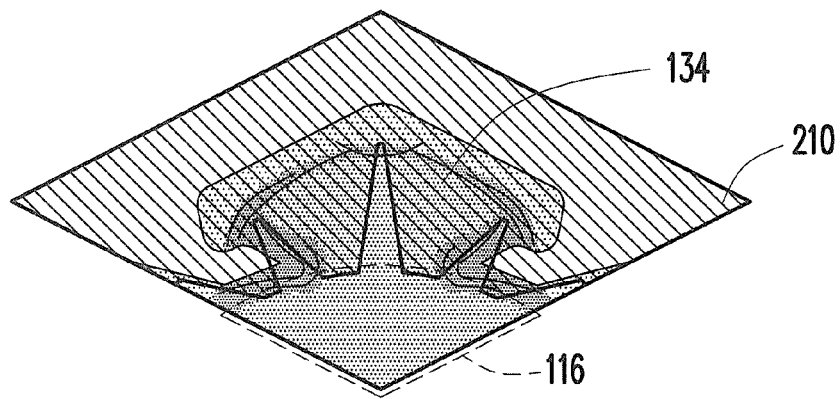
Figure 5D:
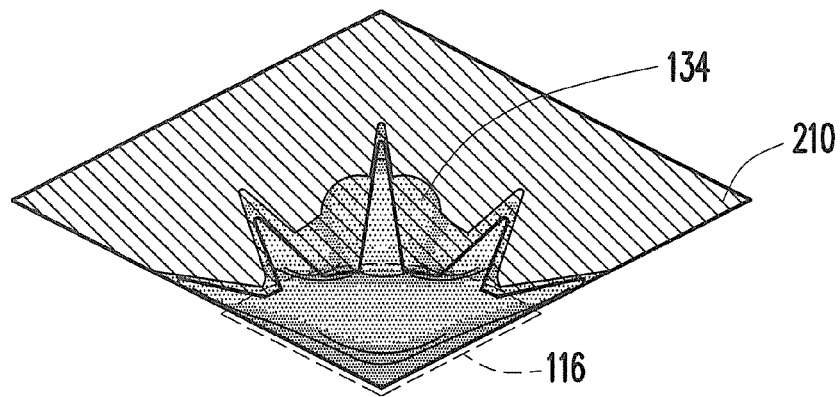
Figure 5E:
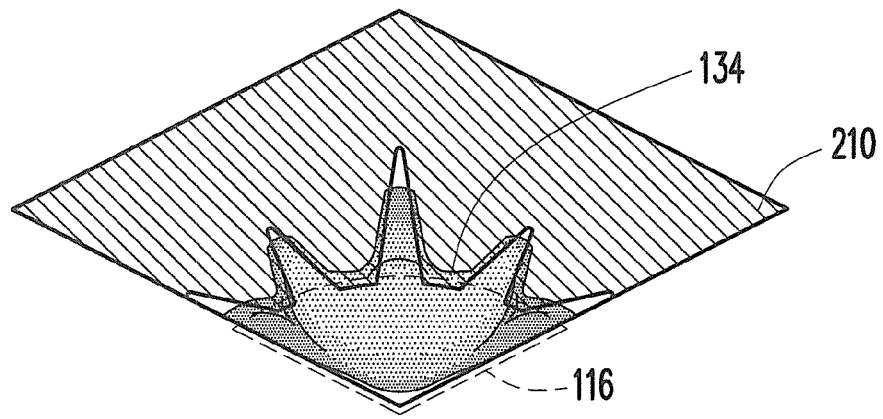
Figure 5F:
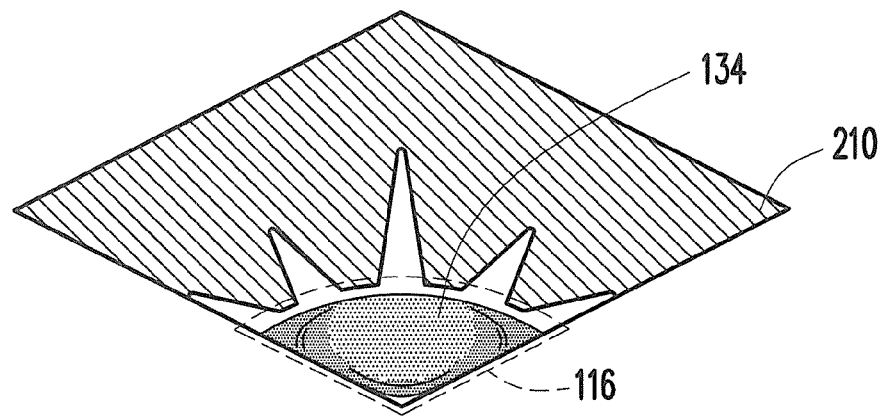

FIGS. 4A and 4B are respectively schematic diagrams illustrating a cross-sectional view and a top view of the pixel structure in FIG. 3 under the no voltage state according to an exemplary embodiment. FIG. 4C and FIG. 4D are respectively schematic diagrams illustrating a cross-sectional view and a top view of the pixel structure in FIG. 3 under the voltage applying state according to an exemplary embodiment. To clearly illustrate the relationship between the contraction of the non-polar fluid and the configuration of the pixel electrode, an insulating layer, a hydrophobic layer, the opposite substrate, and the polar fluid are omitted in FIG. 4B and FIG. 4D. Referring to FIGS. 3 to 4D simultaneously, in the present exemplary embodiment, the first substrate 112 includes a plurality of pixel regions 114. Each of the pixel regions 114 includes a non-electrode region 116 and a distribution region of pixel electrode 118. Herein, electrodes are not disposed in the non-electrode region 116. When a voltage difference is generated between a pixel electrode 210 in the pixel array substrate 110 and the common electrode 124 in the opposite substrate 120, the polar fluid 132 contacts the pixel electrode 210 through an electrostatic force and therefore propels the non-polar fluid 134 to the range of the non-electrode region 116 (as shown in FIGS. 4C and 4D). The distribution region of the pixel electrode 118 is then the range of the pixel region 114 deducting the non-electrode region 116. In the present exemplary embodiment, the non-electrode region 116 has a shape of a ¼ circle, for example. In other exemplary embodiments, the non-electrode region 116 can also have a shape of a rectangle, a triangle, a trapezoid, a polygon, or other shapes. It should be noted that as the non-electrode region 116 and the distribution region of the pixel electrode 118 are defined by distribution range of the non-polar fluid 134 after contraction, a portion of the pixel electrode 210 can also be distributed in the non-electrode region 116 without affecting the contraction of the non-polar fluid 134 in the non-electrode region 116, where the details are to be illustrated later in the disclosure.

The pixel structures 200 are disposed in the pixel regions 114. Here, each of the pixel structures 200 includes a pixel electrode 210, an insulating layer 220, a hydrophobic layer 230, and a barrier 240. The pixel electrode 210, the insulating layer 220, and the hydrophobic layer 230 are stacked sequentially on the pixel region 114 of the substrate 112. The hydrophobic layer 230 is covered by the non-polar fluid 134 and the polar fluid 132 sequentially. The barrier 240 is configured to separate two adjacent pixel structures 200.

Referring to FIGS. 4B and 4D, the pixel electrode 210 is disposed in the distribution region of pixel electrode 118 and has at least one slit 212. An extension direction D1 of the at least one slit 212 extends from the non-electrode region 116 toward the distribution region of pixel electrode 118. In the present exemplary embodiment, the slits 212 communicate with the non-electrode region 116, for example, or the slits 212, for instance, include a plurality of rod-shaped or needle-shaped slits arranged radially. That is, the slits 212 are arranged radially along an intersecting boundary of the non-electrode region 116 and the distribution region of pixel electrode 118, for instance. The slits 212 have a shape of, for example, a needle (as depicted in FIGS. 4B and 4D), a rod, an ellipse, a polygon, a tree branch, a snowflake, a wave, or other shapes. Moreover, the slits 212 have a width substantially ranging from 1 μm to 30 μm, for example. In addition, a total area of the non-electrode region 116 and the slits 212 is 10% to 80% of an area of the pixel region 114, for example.

In the present exemplary embodiment, the contraction of the fluid medium 130 can be determined by a voltage difference between the pixel electrode 210 in the pixel array substrate 110 and the common electrode 124 in the opposite substrate 120 and the slits 212 of the pixel electrode 210. Consequently, the non-polar fluid 134 can contract along the paths of the slits 212 of the pixel electrode 210 so as to avoid fragmentation of the non-polar fluid 134.

Specifically, as shown in FIGS. 4A and 4B, when a voltage is not applied, the polar fluid 132 and the non-polar fluid 134 of the fluid medium 130 can cover the first substrate 112, that is, the pixel regions 114 of the first substrate 112 evenly. The backlight or environmental light is then absorbed by the colored (i.e. black) non-polar fluid 134, so that the display 100 displays the color (i.e. black) of the non-polar fluid 134. Conversely, as depicted in FIGS. 4C and 4D, when a voltage is applied, the polar fluid 132 contacts the pixel electrode 210 through the electrostatic force and thus propels the non-polar fluid 134 to the range of the non-electrode region 116. As a result, the non-polar fluid 134 is jammed to the barrier 240 and the distribution region of the non-polar fluid 134 is therefore reduced and the non-polar fluid 134 is concentrated in the non-electrode region 116 of the pixel region 114. At this time, the backlight can pass through the transparent polar fluid 132 or the environmental light can be reflected by the first substrate 112 for the display 100 to display an image.

In the present embodiment, the pixel electrode 210 has at least one slit 212. To side surfaces of the pixel electrode 210 located on the two sides of any one of the slits 212, a lateral force is provided such that the non-polar fluid 134 contracts along a path in the hydrophobic layer 230 corresponding to the slit 212, so as to convert from the state shown in FIGS. 4A and 4B to the state illustrated in FIGS. 4C and 4D. FIGS. 5A to 5F are schematic diagrams illustrating a process of converting from the state in FIG. 4B to the state in FIG. 4D according to an exemplary embodiment. Referring to FIGS. 5A to 5F, specifically, in the process of converting from the state in FIG. 4B to the state in FIG. 4D, as the non-polar fluid 134 can flow along the path corresponding to the slit 212, the non-polar fluid 134 can flow along the arrangement of the slit 212 to be contracted to a corner of the barrier 240. Conversely, when converting from the state in FIG. 4D to the state in FIG. 4B, the non-polar fluid 134 blocks the polar fluid 132 to the pixel array substrate 110 through the hydrophobic layer 230 to cover entirely. It should be noted that the configuration of the pixel electrode 210 allows the non-polar fluid 134 to flow along the path corresponding to the slit 212, so that the non-polar fluid 134 does not fragmentize or discontinue during the contraction and the contraction speed of the non-polar fluid 134 between the no voltage state and the voltage applying state is accelerated. In other words, the pixel structure can convert rapidly between the voltage applying state and the no voltage state.

Figure 6A:
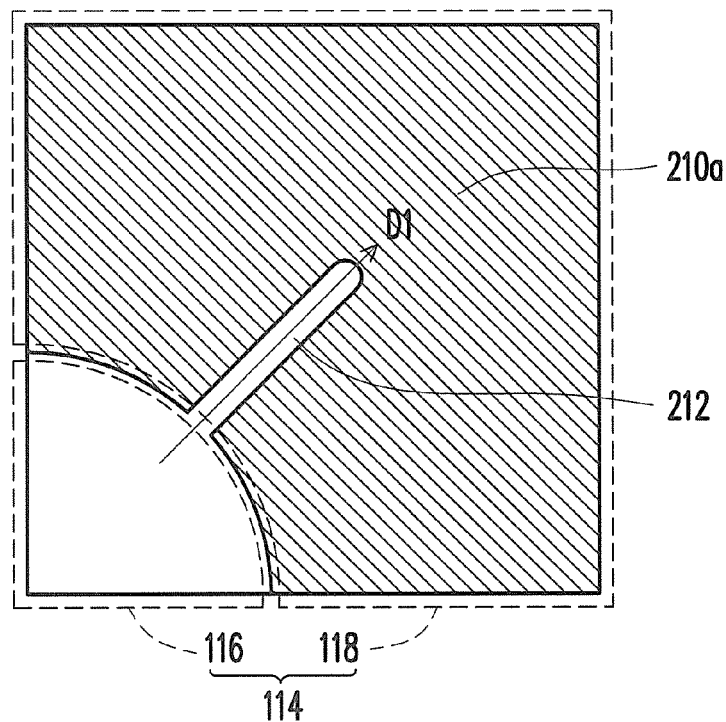
FIG. 6A is a schematic top view illustrating a pixel electrode of a display according to an exemplary embodiment.
Figure 6B:
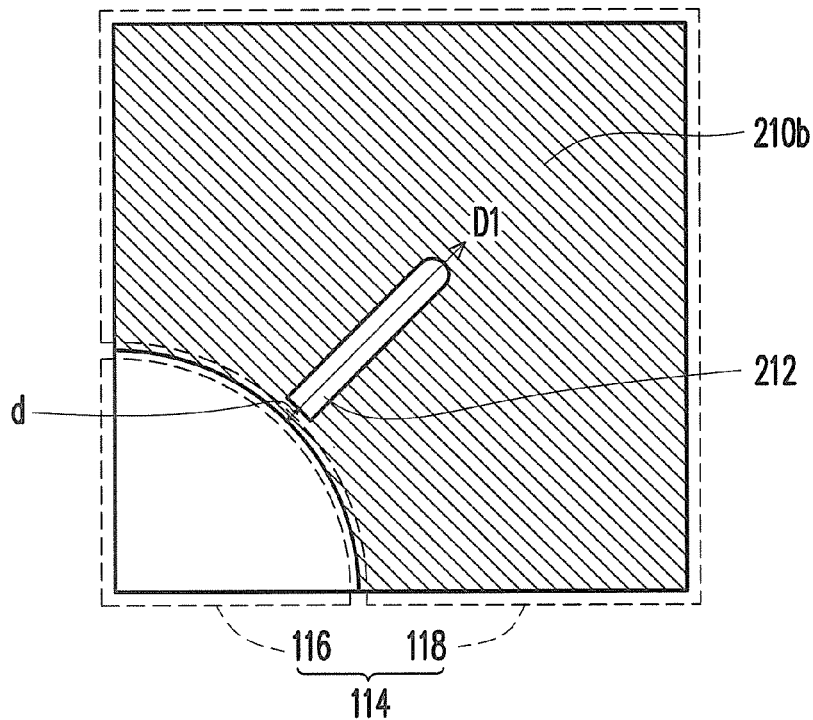
FIG. 6B is a schematic top view illustrating a pixel electrode of a display according to an exemplary embodiment.
Figure 6C:
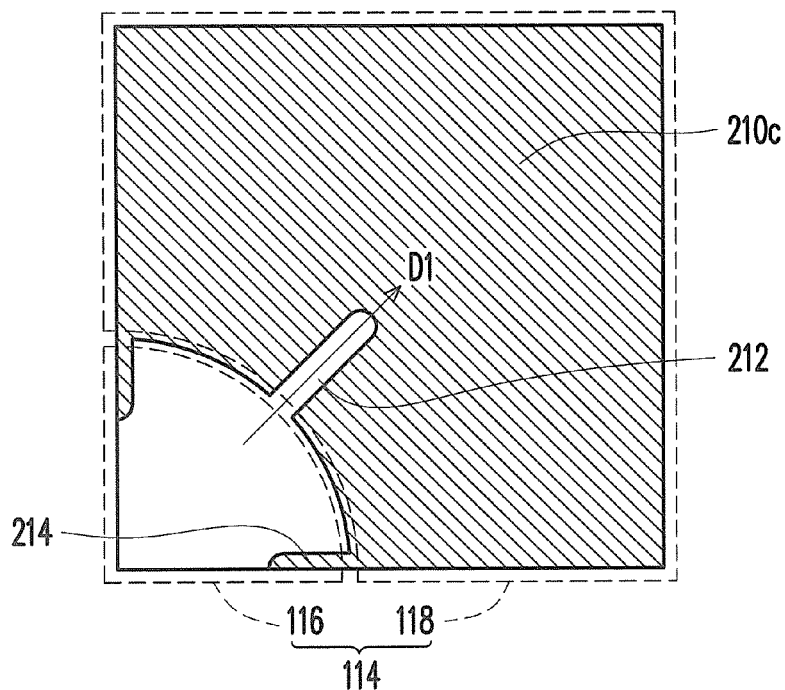
FIG. 6C is a schematic top view illustrating a pixel electrode of a display according to an exemplary embodiment.
Figure 6D:
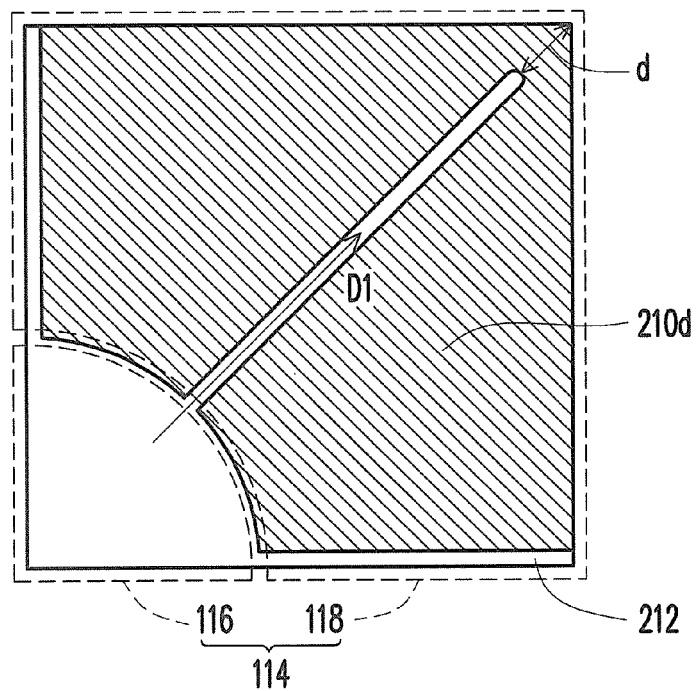
FIG. 6D is a schematic top view illustrating a pixel electrode of a display according to an exemplary embodiment.
Figure 6E:
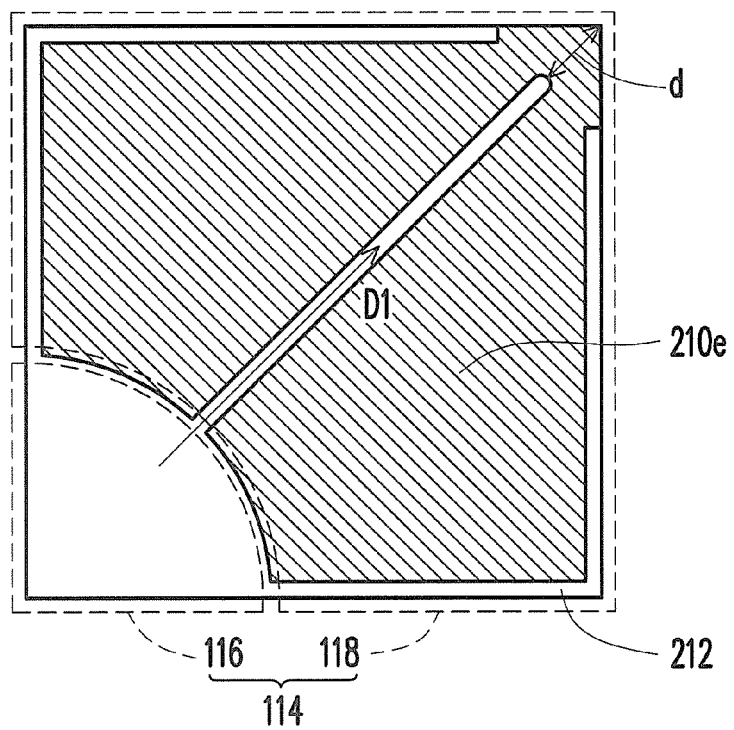
FIG. 6E is a schematic top view illustrating a pixel electrode of a display according to an exemplary embodiment.
Figure 6F:
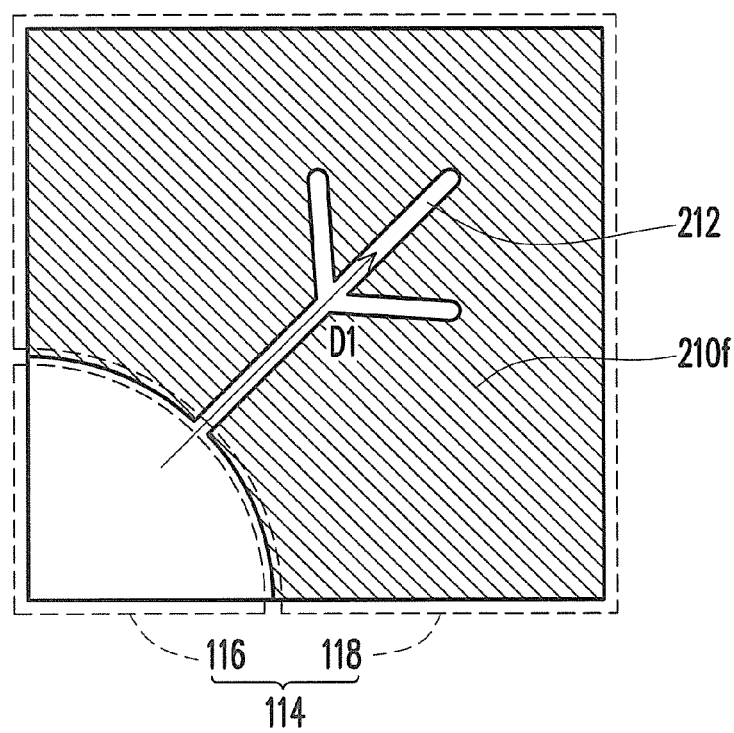
FIG. 6F is a schematic top view illustrating a pixel electrode of a display according to an exemplary embodiment.
Figure 6G:
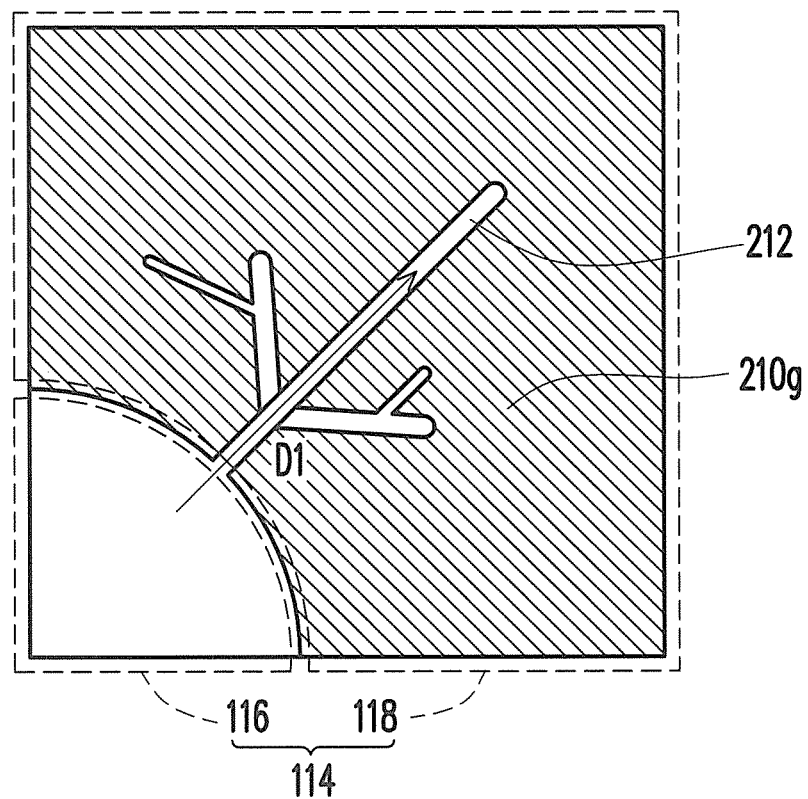
FIG. 6G is a schematic top view illustrating a pixel electrode of a display according to an exemplary embodiment.
Figure 7A:
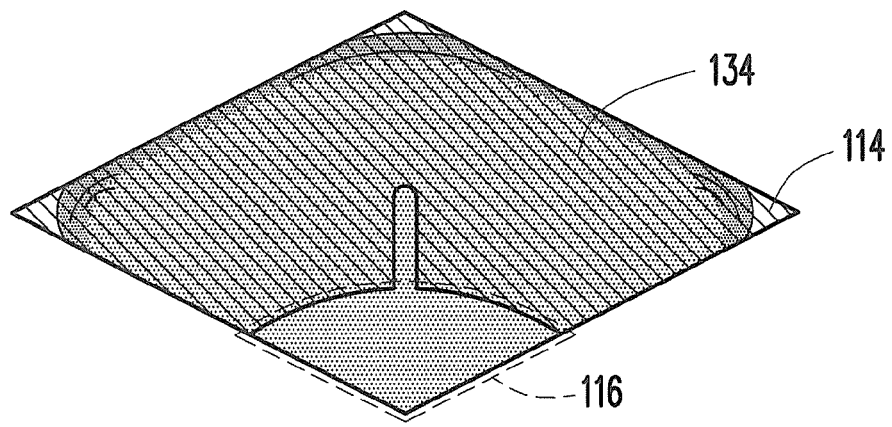
FIGS. 7A to 7F are schematic diagrams illustrating a contraction process of a non-polar fluid converting from a no voltage state to a voltage applying state in the pixel electrode shown in FIG. 6A according to an exemplary embodiment.
Figure 7B:
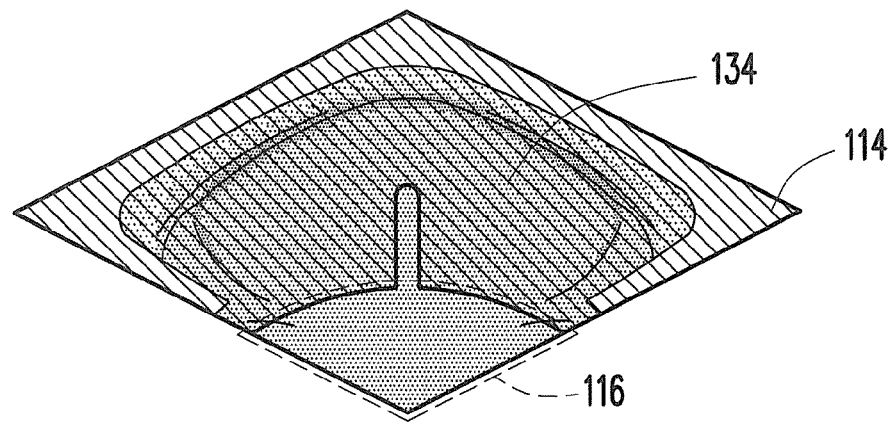
Figure 7C:
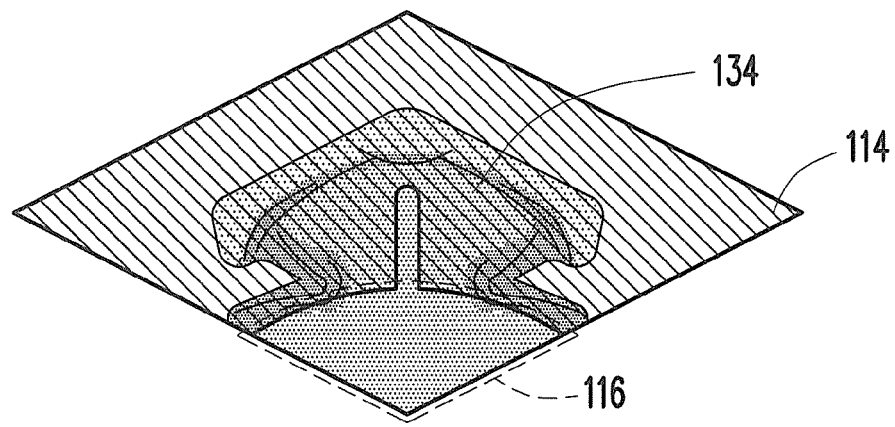
Figure 7D:
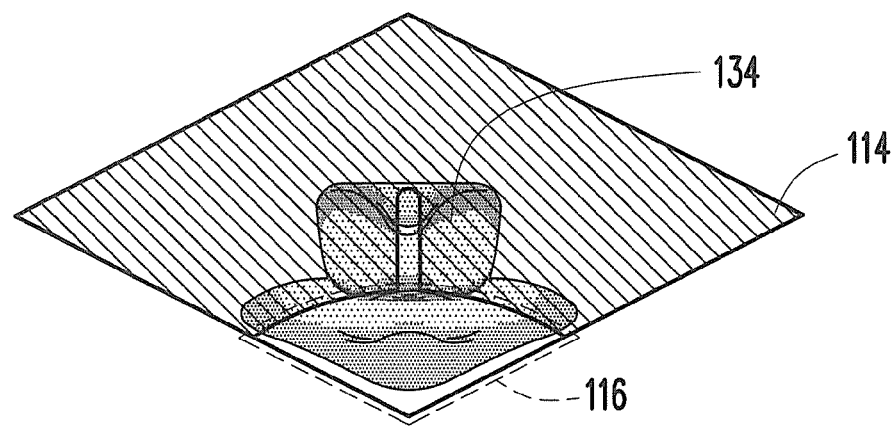
Figure 7E:
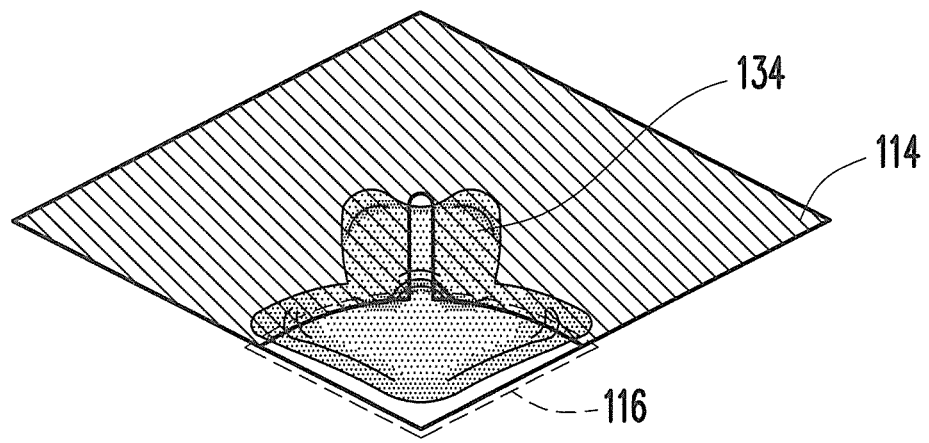
Figure 7F:
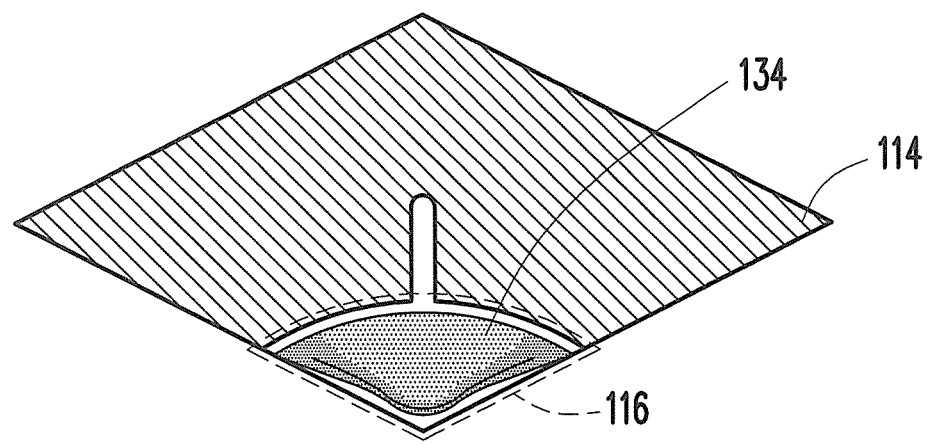

It should be illustrated that although the pixel electrode 210 in the present exemplary embodiment has a plurality of needle shaped slits 212 arranged radially, the slits 212 of the pixel electrode 210 can have other numbers, configurations, and arrangements. For instance, in another exemplary embodiment, as depicted in FIG. 6A, a pixel electrode 210a includes a slit 212. The slit 212, for example, communicates with the non-electrode region 116 and has a consistent width. In another exemplary embodiment as shown in FIG. 6B, a slit 212 of a pixel electrode 210b does not communicate with the non-electrode region 116, for instance, and a distance d between the slit 212 and the non-electrode region 116 is substantially smaller than 30 µm, for example. In another exemplary embodiment, a pixel electrode 210c includes, for example, at least one protrusion 214 extending from the distribution region of pixel electrode 118 to the non-electrode region 116. In details, the protrusions 214 are disposed along the edge of the non-electrode region 116, for instance. Further, in another exemplary embodiment as illustrated in FIGS. 6D and 6E, slits 212 of a pixel electrode 210d and a pixel electrode 210e are disposed along a portion of an edge of the distribution region of pixel electrode 118, for instance. Here, it should be noted that the distance d between the slits 212 and the edges of the pixel electrodes 210d, 210e substantially ranges from 1 µm to 30 µm, and is preferably larger than 20 µm. In addition, in another exemplary embodiment as displayed in FIGS. 6F and 6G, slits 212 of a pixel electrode 210f and a pixel electrode 210g have a shape of a tree branch (as shown in FIG. 6F) or a snowflake (as shown in FIG. 6G), or instance. Here, the slits 212 can have a consistent width or a non-consistent width. It should be noted that the contraction of the non-polar fluid 134 differs with the configuration of the pixel electrode. Take the pixel electrode 210a illustrated in FIG. 6A as an example, FIGS. 7A to 7F are schematic diagrams showing a contraction process of the non-polar fluid 134 converting from the no voltage state to the voltage applying state in the pixel electrode 210a. Referring to FIGS. 7A to 7F, the non-polar fluid 134 can flow along the path corresponding to the slit 212, so that the non-polar fluid 134 does not fragmentize and thus discontinue during the contraction and the contraction speed of the non-polar fluid 134 between the no voltage state and the voltage applying state is accelerated. In other words, the pixel structure can convert rapidly between the voltage applying state and the no voltage state.

In the exemplary embodiment aforementioned, as the pixel electrode has the slit with the extension direction from the non-electrode region toward the distribution region of pixel electrode, the non-polar fluid can contract along the path corresponding to the slit, thereby preventing the fragmentation of the non-polar fluid in the contraction process, especially the possible fragmentation of the non-polar fluid when the non-polar fluid is driven under high voltage. Hence, the response speed of the display is increased, stable grayscale driving display is achieved, and the complexity of the driving system is reduced.

Figure 1A:
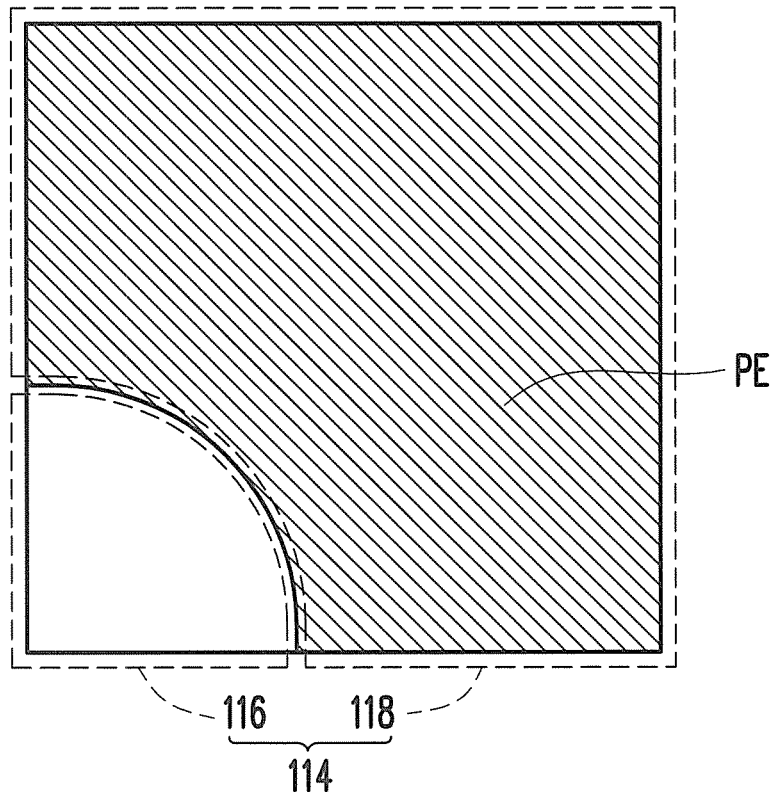
FIG. 1A and FIG. 1B are respectively schematic diagrams illustrating top views of a pixel electrode in a conventional display.
Figure 1B:
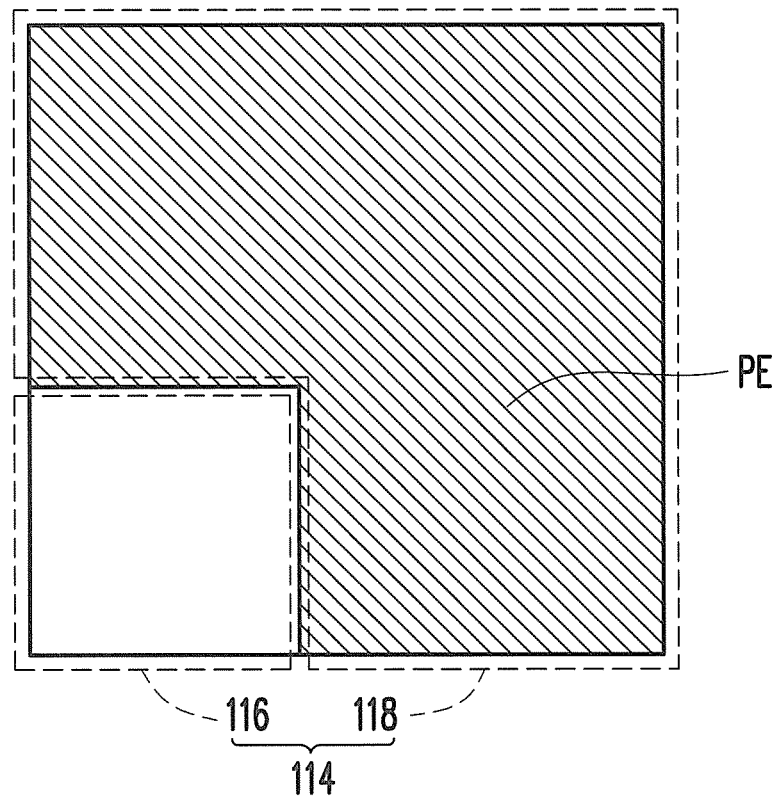
Figure 2A:
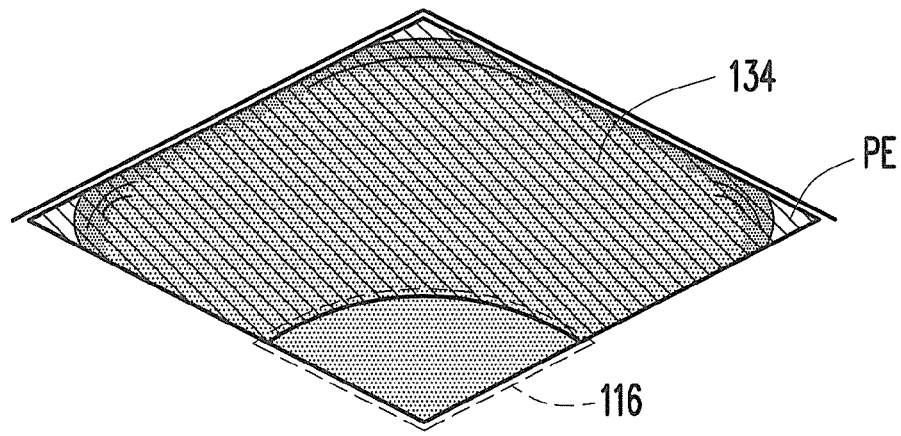
FIGS. 2A to 2E are three-dimensional (3D) schematic diagrams illustrating a contraction process of a polar fluid converting from a no voltage state to a voltage applying state in an electrowetting display pixel structure having the pixel electrode shown in FIG. 1A.
Figure 2B:
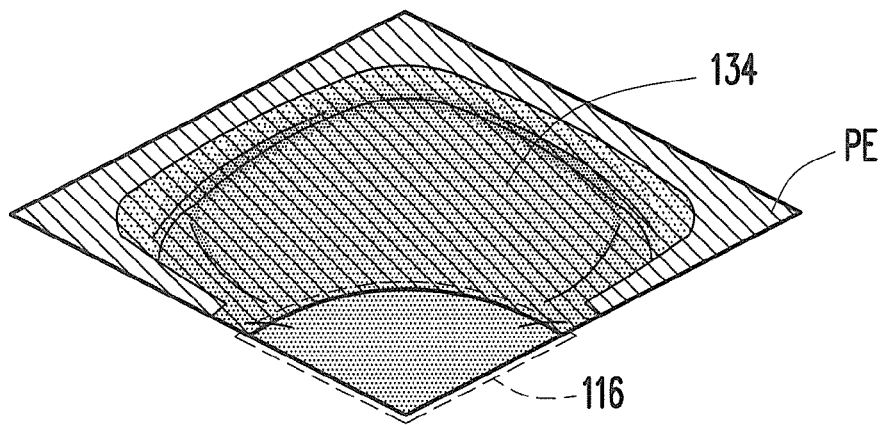
Figure 2C:
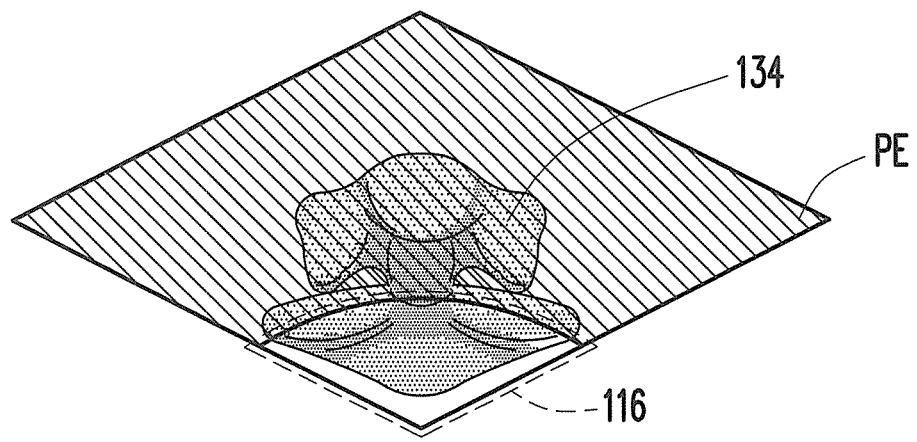
Figure 2D:
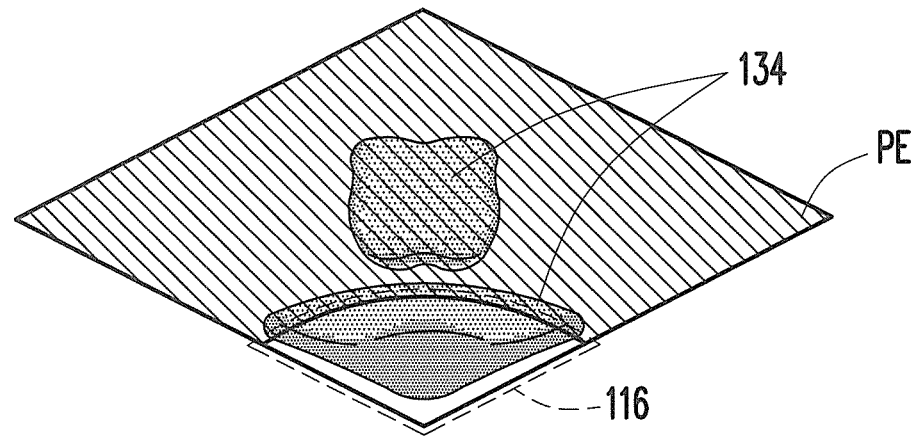
Figure 2E:
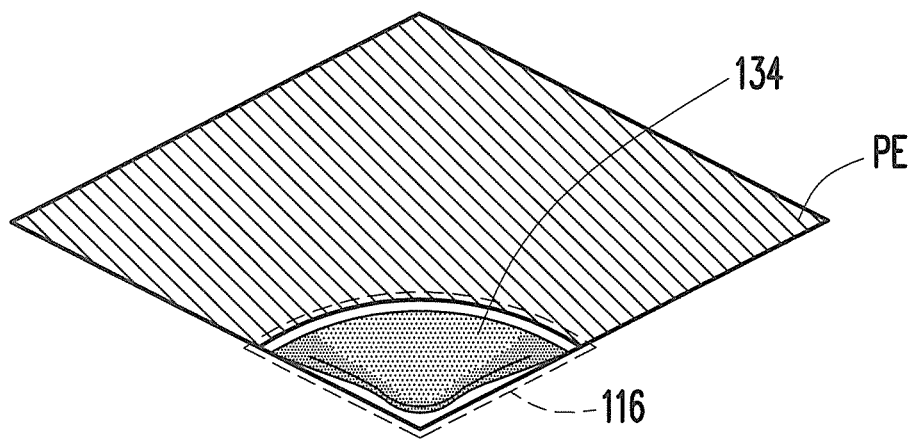
Figure 8:
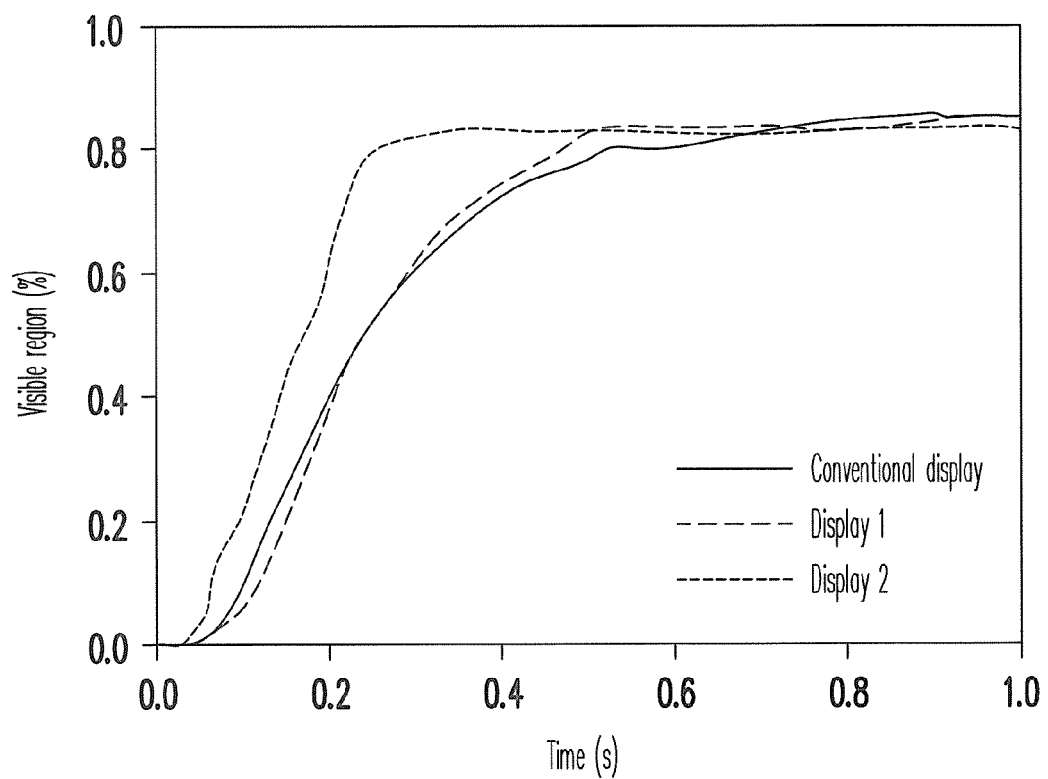
FIG. 8 is a schematic diagram illustrating a simulation relationship of a visible region percentage achieved by a display in the disclosure and the conventional display during a voltage applying state over different time periods.

In the following, the performance of the disclosure is verified through a simulation example. FIG. 8 is a schematic diagram illustrating a simulation relationship of a visible region percentage achieved by a display in the disclosure and the conventional display during a voltage applying state over different time period for showing a response time of the display. The visible region percentage represents a percentage occupied by a visible region in a single pixel region. In an exemplary embodiment of the disclosure, a display 1 and a display 2 respectively have the pixel electrodes shown in FIGS. 6A and 4B, and the conventional display has the pixel electrode PE shown in FIG. 1B. Herein, the pixel electrode PE is disposed in the distribution region 118 of pixel electrode of the pixel region 114 and has an unfilled corner of a ¼ rectangle (that is, the non-electrode region 116). As illustrated in FIG. 8, comparing to the conventional display, the display 1 and the display 2 in an exemplary embodiment of the disclosure can obtain a higher visible region percentage in the same time period. In other word, the display 1 and the display 2 in an exemplary embodiment of the disclosure have a faster response speed. Accordingly, disposing the slit having the extension direction from the non-electrode region toward the distribution region of pixel electrode in the pixel electrode does accelerate the contraction speed of the non-polar fluid and prevent the fragmentation of the non-polar fluid during the contraction, such that the display can have a faster response speed.

In the pixel structure of the display in an exemplary embodiment of the disclosure, the pixel electrode has the slit with the extension direction from the non-electrode region toward the distribution region of pixel electrode. The slit can enhance the contraction of the non-polar fluid to the non-electrode region to prevent the non-polar fluid from fragmentizing in the contraction process and can therefore increase the response speed. As a result, the display has faster response speed, more stable grayscale driving display, and superior display quality.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display, comprising:
   a pixel array substrate, comprising:
      a first substrate comprising a plurality of pixel regions, each of the pixel regions comprising a distribution region of pixel electrode and a non-electrode region;
      a plurality of pixel structures disposed in the pixel regions, wherein each of the pixel structures comprises:
         a pixel electrode disposed in the distribution region of pixel electrode and having at least one slit, an extension direction of the at least one slit extending from the non-electrode region toward the distribution region of pixel electrode, the pixel electrode further comprising at least one protrusion extending from the distribution region of pixel electrode to the non-electrode region;
         an insulating layer covering the pixel electrode; and
         a hydrophobic layer covering the insulating layer;
   a fluid medium comprising a polar fluid and a non-polar fluid; and
   an opposite substrate, comprising:
      a second substrate; and
      a common electrode disposed on the second substrate and contacting the polar fluid,
   wherein the polar fluid and the non-polar fluid are present between the first substrate and the second substrate, and the non-polar fluid is contracted toward the non-electrode region when a voltage difference is generated between the pixel electrode and the common electrode.

2. The display as claimed in claim 1, wherein the at least one slit communicates with the non-electrode region.

3. The display as claimed in claim 1, wherein the at least one slit does not communicate with the non-electrode region and a distance between the at least one slit and the non-electrode region is substantially smaller than 30 μm.

4. The display as claimed in claim 1, wherein the at least one slit comprises a shape of a rod, a needle, an ellipse, a polygon, a wave, a tree branch, or a snowflake.

5. The display as claimed in claim 1, wherein the non-electrode region comprises a shape of a rectangle, a ¼ circle, a triangle, a trapezoid, or a polygon.

6. The display as claimed in claim 1, wherein the at least one slit comprises a plurality of slits arranged radially along an intersecting boundary of the non-electrode region and the distribution region of pixel electrode.

7. The display as claimed in claim 1, wherein the at least one slit is located at an edge of the distribution region of pixel electrode.

8. The display as claimed in claim 1, wherein a width of the at least one slit substantially ranges from 1 μm to 30 μm.

9. The display as claimed in claim 1, wherein a total area of the non-electrode region and the at least one slit is 10% to 80% of an area of the pixel region.

* * * * *